(No Model.)
A. DRATT.
VEHICLE RUNNING GEAR.
No. 506,814. Patented Oct. 17, 1893.
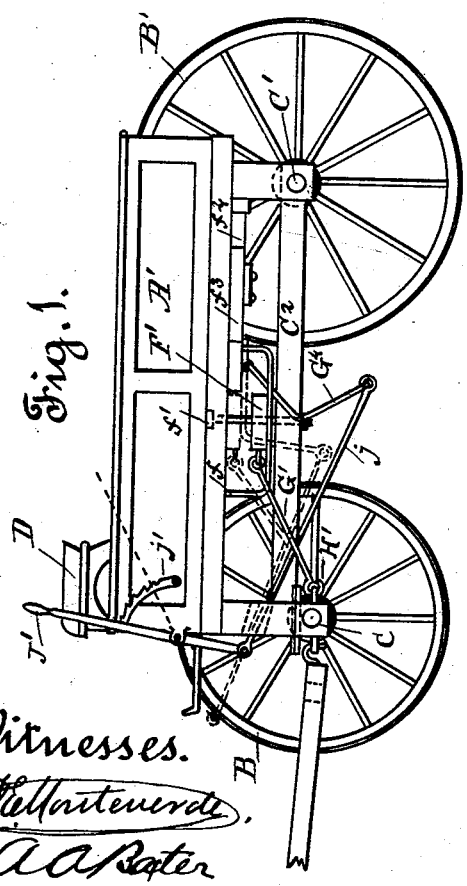
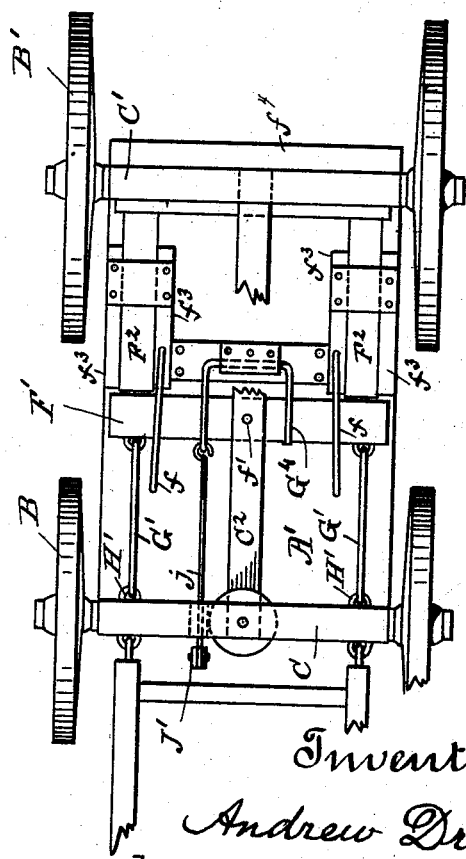
Witnesses.
Inventor.
Andrew Dratt
by A. H. Ste Marie
att'y

UNITED STATES PATENT OFFICE.

ANDREW DRATT, OF SAN FRANCISCO, CALIFORNIA.

VEHICLE RUNNING-GEAR.

SPECIFICATION forming part of Letters Patent No. 506,814, dated October 17, 1893.
Application filed April 24, 1893. Serial No. 471,642. (No model.)

*To all whom it may concern:*

Be it known that I, ANDREW DRATT, a citizen of the United States, residing at San Francisco, in the county of San Francisco and State of California, have invented certain new and useful Improvements in Vehicle Running-Gears; and I do declare the following to be a full, clear, and exact description of the invention, such as will enable others skilled in the art to which it appertains to make and use the same, reference being had to the accompanying drawings, and to the letters of reference marked thereon, which form a part of this specification.

The object of my invention is to provide means whereby the driver of a truck, wagon, carriage, or other four-wheeled conveyance may be given full control over the running-gears thereof, and thus to put it wholly within his power to keep the vehicle in a straight line or allow it to turn sidewise, as he may see fit.

In vehicles as usually constructed the fore and hind gears are always free to move independently of each other, that is the fore axle and wheels, the tongue, the fore hounds, and the sway-bar, if any, are at all times free to oscillate about the king-bolt independently of the hind gear whether it is desired to go ahead, move backward, or turn to one side. The result is that if the surface of the ground traveled over is rough or uneven the fore gear is constantly exposed to be thrown out of position and the course of the vehicle changed by every obstacle that the fore wheels meet or by every hole they fall into, the tongue being sometimes thrown violently from side to side and the horses repeatedly hit or subjected to unceasing jerks that worry them and rapidly wear out their harness. Again, in backing up a vehicle made after the old style, it is now and then a hard task, even for an experienced hand, to run it back in a straight line to the exact spot where it is wanted, owing to the lay of the place, the nature of the ground, the restlessness of the horses, &c., all for want of a proper check, upon the moves of the running-gear. This is what my invention is intended to supply by providing a cheap, handy, and effective device that will afford due restraint upon the movements of the vehicle whether it be moving backward or forward.

To this end and purpose, my invention consists in providing the running-gear of four-wheeled vehicles with a locking device that can be applied and removed whenever desired and which will so fasten the fore-carriage that the fore axle may be kept at right angles to the coupling-pole and the tongue or shafts connected therewith prevented from oscillating in any way about the king-bolt, as would be the case were the fore gear allowed its usual freedom of action.

Referring to the accompanying drawings for a detailed description of my invention,—Figure 1, is a side elevation of an ordinary wagon provided with my invention, the two wheels on the near side being removed. Fig. 2, is a plan of said wagon, looking from the bottom of Fig. 1.

Corresponding parts are denoted by corresponding letters of reference throughout the different views.

$A'$ is used to indicate the body or bed of a wagon and $B$ $B'$ $C$ $C'$ respectively denote the wheels and axles thereof.

The locking device is located beneath the vehicle and consists of a transversal bar $F'$ confined within guides $f$ and adapted to swing about a pivot pin or bolt $f'$ passing through the bottom of the bed and the coupling-pole $C^2$. Rods $G'$ secured to the axle $C$ through the medium of eye-bolts $H'$ are attached to each end of said bar so that it and the axle may move only in parallel planes. If therefore the bar $F'$ is left free to turn about its pivot, as shown by full lines in Fig. 1, the axle will be equally free to turn with it and the wagon may be directed along any desired course. But if said bar is prevented from moving sidewise by any suitable means, for instance by being raised so as to rest against the ends of longitudinal bars $F^2$, as shown in dotted lines in said Fig. 1, the axle $C$ is likewise kept from oscillating and the running-gear remains as securely locked as in the case of the truck above-described. The raising of the bar $F'$ may be effected by means of a chain, if desired, but it is preferably accomplished by the agency of a bent rod $G^4$ which is operated from the driver's seat D through the medium of a link $j$ and a hand-lever $J'$ adapted to engage a notched bar $j'$. By preference also the longitudinal bars $F^2$ are made sliding so that they may always be brought into the best position with relation to the bar $F'$ according as the wagon is empty or loaded.

If loaded the bottom of the bed is likely to protrude downward and the locking bar readily reaches the sliding pieces, but if empty the bar $F'$ has to be raised up higher and is sometimes prevented by the rods $G'$ from reaching far enough back to come in contact with the ends of the bars $F^2$. In the latter case the bars $F^2$ are slid more or less forward between guides $f^3$ and adjusted in the proper position by means of cross-bars $f^4$ inserted between their outer ends and the hind part of the wagon.

It will be observed from the foregoing that the device is thoroughly effective in so far as it will readily lock the running-gear and allow it only such movement as the driver of the conveyance will determine upon. With it the running-gear may be so fastened that the vehicle will not deviate one inch from the line it is made to follow and keep straight on its course notwithstanding the irregularities of the ground or the obstacles met with on the road. With it both axles will be kept parallel and the tongue or shafts steadied so that they will not vibrate in the least, thereby relieving the horses from the painful or vexatious thrusts and pulls they commonly have to endure and greatly adding to the comfort of the driver.

Having now described my invention, what I claim, and desire to secure by Letters Patent of the United States, is—

1. The combination, in a running gear, of the front axle, a transverse locking bar carried thereby, mechanism for raising said bar, and a stop adapted to impinge against the ends of said bar when raised and lock the same.

2. The combination of the front axle, a vertically movable bar carried thereby, mechanism for raising said bar, a sliding stop for said bar, and one or more adjusting bars to regulate said stop.

3. In a running gear, the combination with the front axle, of a pivoted horizontal locking bar connected to the axle and adapted to slide vertically on its pivot, an oscillating rod bearing against said locking bar and adapted to raise the same, and a sliding stop adapted to impinge against said locking bar when raised.

In testimony whereof I affix my signature in presence of two witnesses.

ANDREW DRATT. [L. S.]

Witnesses:
 A. A. BAXTER,
 R. R. STRAIN.